(12) United States Patent
Yeung et al.

(10) Patent No.: US 8,755,474 B2
(45) Date of Patent: Jun. 17, 2014

(54) SIGNAL CONDITIONING BY COMBINING PRECURSOR, MAIN, AND POST CURSOR SIGNALS WITHOUT A CLOCK SIGNAL

(75) Inventors: Tony Yeung, Milpitas, CA (US); Michael Yimin Zhang, Palo Alto, CA (US)

(73) Assignee: Pericom Semiconductor Corporation, Milpitas, CA (US)

( * ) Notice: Subject to any disclaimer, the term of this patent is extended or adjusted under 35 U.S.C. 154(b) by 188 days.

(21) Appl. No.: 13/326,020

(22) Filed: Dec. 14, 2011

(65) Prior Publication Data

US 2013/0159759 A1 Jun. 20, 2013

(51) Int. Cl.
*H03D 1/04* (2006.01)

(52) U.S. Cl.
USPC .......................................................... 375/346

(58) Field of Classification Search
USPC ........................... 375/316, 346, 350; 713/401
See application file for complete search history.

(56) References Cited

U.S. PATENT DOCUMENTS

| 7,391,251 | B1 | 6/2008 | Zhang et al. |
| 7,915,923 | B1 | 3/2011 | Yeung et al. |
| 8,494,377 | B1 * | 7/2013 | Cirit ............................... 398/193 |
| 8,514,983 | B2 * | 8/2013 | Lee et al. ....................... 375/340 |

\* cited by examiner

*Primary Examiner* — Khanh C Tran
(74) *Attorney, Agent, or Firm* — The Webostad Firm

(57) ABSTRACT

Embodiments of an apparatus for signal conditioning, a serial data interface, and a method for a programmable delay filter are disclosed. In an embodiment of an apparatus for signal conditioning, a wave shaping circuit has a precursor signal, a post cursor signal, and a main signal combined to provide an output signal. The precursor signal, the post cursor signal, and the main signal are provided for combination independently of a clock signal. The main signal is delayed relative to the precursor signal, and the post cursor signal is delayed relative to the main signal.

18 Claims, 6 Drawing Sheets

SIGNAL CONDITIONING BY COMBINING PRECURSOR, MAIN, AND POST CURSOR SIGNALS WITHOUT A CLOCK SIGNAL

FIELD

One or more aspects of the invention generally relate to integrated circuits. More particularly, one or more aspects of the invention generally relate to signal conditioning by combining precursor, main, and post cursor signals independently of a clock signal.

BACKGROUND

Conventionally, in a high-speed digital transmission, pre-emphasis is used to condition an output of a transmitter. In transmitting data, such transmitted data may be distorted due to any of a variety of factors, including without limitation, a transmission medium such as a transmission line or lines for example. Such distortion may be more pronounced when transmitting data at high transfer rates. For example, Peripheral Component Interconnect Express ("PCIe") 3.0 is at approximately 8 gigatransfers per second (GT/s). Pre-emphasis may be used to pre-distort a signal prior to or during transmission in order to counteract anticipated distortion downstream in the transmission path. Accordingly, a received signal which more closely resembles an originally transmitted signal may be obtained.

In high-speed digital transmission, de-emphasis conventionally refers to having a first bit after a transition with a higher level than any other bits between such transition and a next transition. Thus, for example, the level of any and all bits between transitions may be less than the level of a first of such bits. In a transmission, bits immediately following a transition have higher frequency content than those bits that do not immediately follow a transition. Thus, bits with lower frequency content are de-emphasized, or conversely, bits with high frequency content are emphasized over bits with low frequency content. As bits with high frequency content conventionally have more losses over a channel than bits with low frequency content, such emphasis of bits with high frequency content may be used to pre-condition a signal to compensate for such losses to provide a more equalized signal when received.

Accordingly, it would be desirable and useful to provide both pre-emphasis and de-emphasis.

BRIEF SUMMARY

One or more aspects generally relate to signal conditioning by combining precursor, main, and post cursor signals independently of a clock signal.

An embodiment relates to an apparatus for signal conditioning. In such an embodiment, a wave shaping circuit has a precursor signal, a post cursor signal, and a main signal combined to provide an output signal. The precursor signal, the post cursor signal, and the main signal are provided for combination independently of a clock signal. The main signal is delayed relative to the precursor signal, and the post cursor signal is delayed relative to the main signal.

Another embodiment relates to a serial data interface. In such an embodiment, there is an input port and an output port. The input port is for receiving a transmitted signal. The input port is coupled to a first delay block and a second delay block for providing the transmitted signal to each thereof. A third delay block is coupled to the second delay block for receiving the transmitted signal. A first output of the first delay block is a precursor signal for emulation of a pre-shoot path. A second output of the second delay block is a main signal for emulation of a transition path. A third output of the third delay block is a post cursor signal for emulation of pre-emphasis or de-emphasis path. The precursor signal and the post cursor signal are for conditioning the main signal to provide a conditioned version of the transmitted signal independently of a clock. A combiner circuit is used to receive and to combine the first output, the second output, and the third output to provide the conditioned version of the transmitted signal to the output port.

Another embodiment relates to a method for a programmable delay filter. A transmitted signal is obtained. The transmitted signal is wave shaped by: buffering the transmitted signal with a buffer to provide a precursor signal; first delaying the transmitted signal with a first adjustable delay to provide a main signal; second delaying the main signal with a second adjustable delay to provide a post cursor signal; and combining the precursor signal, the main signal, and the post cursor signal to provide an output signal. The main signal is delayed relative to the precursor signal, and the precursor signal, the main signal, and the post cursor signal are combined independently of a clock signal.

BRIEF DESCRIPTION OF THE DRAWING(S)

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
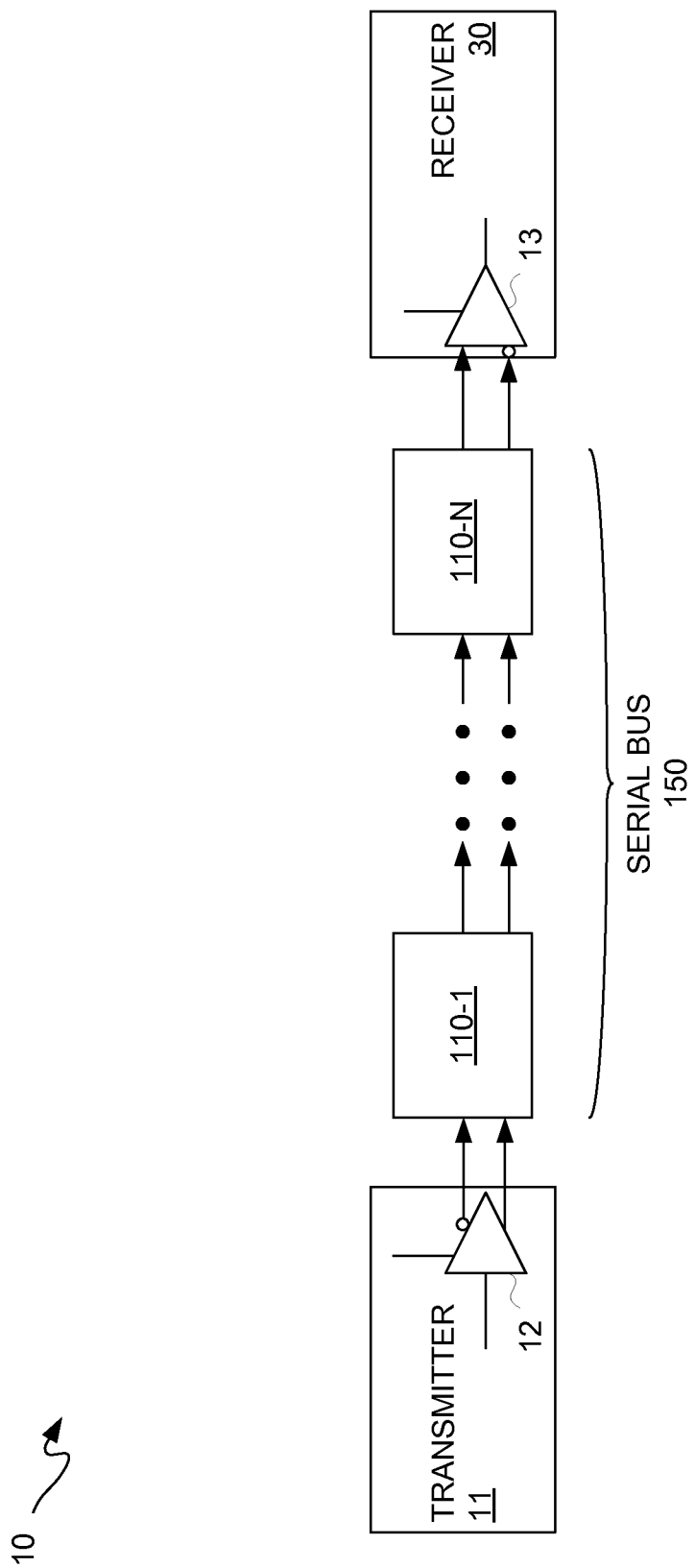
FIG. 1 is a block diagram depicting an exemplary embodiment of a serial bus communication system.

In the following description, numerous specific details are set forth to provide a more thorough description of the specific embodiments. It should be apparent, however, to one skilled in the art, that the invention may be practiced without all the specific details given below. In other instances, well-known features have not been described in detail so as not to obscure the embodiments. For ease of illustration, the same number labels are used in different diagrams to refer to the same items; however, in alternative embodiments the items may be different. Furthermore, though particular data and transfer rates are described herein for purposes of clarity by way of example, the scope of the description is not limited to these particular numerical examples as other values may be used.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A low power intermediary signal conditioning device powered by a DC-to-DC voltage converter may be used. The combination of such an intermediary signal conditioning device with a DC-to-DC voltage converter may be used to provide a serial interface, where such serial interfaced may be provided in a single chip, namely a monolithic integrated circuit ("IC"), or as two separate dies of a multi-chip module ("MCM"), including without limitation a stacked die. A stacked die may include for example a carrier having one or more die formed thereon, and thus use of the term MCM may include a single "chip" having multiple dies. For example, such a DC-to-DC voltage converter may be formed on a same semiconductor die, namely monolithic integration, with an intermediary signal conditioning device. An intermediary signal conditioning device is described in U.S. Pat. No. 7,915,923, an example of such an intermediary signal conditioning device is a ReDriver™ device available from Pericom Semiconductor Corporation of San Jose, Calif. ("Pericom"). Such a DC-to-DC voltage converter and an intermediary signal conditioning device, such as a ReDriver™ device available from Pericom, may be integrated within a same MCM.

A DC-to-DC voltage converter, which is a voltage step-down regulator, may provide a low voltage supply to an intermediary signal conditioning device for high-speed data communication, such as high-speed differential signaling for transmission of serial data. By high-speed, it generally should be understood to be data rates at least compliant with a Peripheral Component Interconnect Express ("PCIe") 3.0 specification. Moreover, such data rates may be in excess of 5 Gigabits per second ("Gbps"), such as for example for Serial Advanced Technology Attachment ("SATA") 3.0, Serial Attached SCSI ("SAS") 2.0, or other high-speed data interface specification. For purposes of clarity by way of example and not limitation, PCIe 3.0 is described below; however, other protocols with same or other data or transfer rates may be used.

Referring to FIG. 1, there is shown a block diagram depicting an exemplary embodiment of a serial bus communication system 10. Serial bus communication system 10 includes transmitter 11, receiver 30, and serial bus 150. As used herein, the terms "include" and "including" shall mean to include without limitation. Serial bus 150 includes one or more programmable intermediary signal conditioning devices ("driver circuits") 110-1 through 110-N (singly and collectively "driver circuit 110"), for N a positive integer greater than one, coupled in series. It should be appreciated that a single driver circuit 110 may be used in serial bus 150, depending on trace or cable length of such serial bus. For purposes of clarity and not limitation, it shall be assumed that traces are used. Thus, a driver circuit 110 may be used as a serial link driver interface for serial bus 150, or multiple driver circuits 110 may be used to provide a serial link driver interface for serial bus 150. Additionally, it should be appreciated that serial bus 150 includes traces formed of a transmission medium, such as conductive material or other means for propagating electric signals for example.

Transmitter 11 may be implemented in a larger block, such as any of a variety of integrated circuits or devices, including but not limited to input/output ("I/O") hubs, root complexes, servers, and laptop docking stations, among others. Furthermore, it should be appreciated that receiver 30 may be embedded in a larger block, such as any of a variety of peripheral devices, including but not limited to hard disk drives, graphics cards, and daughter cards, among others.

Transmitter 11 in this example includes a differential output driver 12 for providing a differential signal to driver circuit 110. Driver circuit 110 processes an output transmission from transmitter 11 to provide such processed output transmission to another driver circuit or directly to receiver 30. Receiver 30 includes a differential input driver 13.

There are many known differential digital signaling protocols, such as differential Stub-Series Terminated Logic ("SSTL"), differential High-Speed Transceiver Logic ("HSTL"), Low-Voltage Differential Signaling ("LVDS"), differential Low-Voltage Positive Emitter Coupled Logic ("LVPECL"), and Reduced Swing Differential Signaling ("RSDS") among other differential digital signaling protocols. Additionally, single-ended serial interface protocols may be used, such as Low Voltage Transistor-Transistor Logic ("LVTTL") such as used for PCI, and Low Voltage Complementary Metal Oxide Semiconductor ("LVCMOS"), among other single-ended serial interface protocols. Conventionally PCI uses an LVTTL input buffer and a push-pull output buffer. Communication via serial bus 150 may use a differential or single-ended signaling protocol. However, for purposes of clarity and not limitation, it shall be assumed that differential signaling is used.

Figure 2:
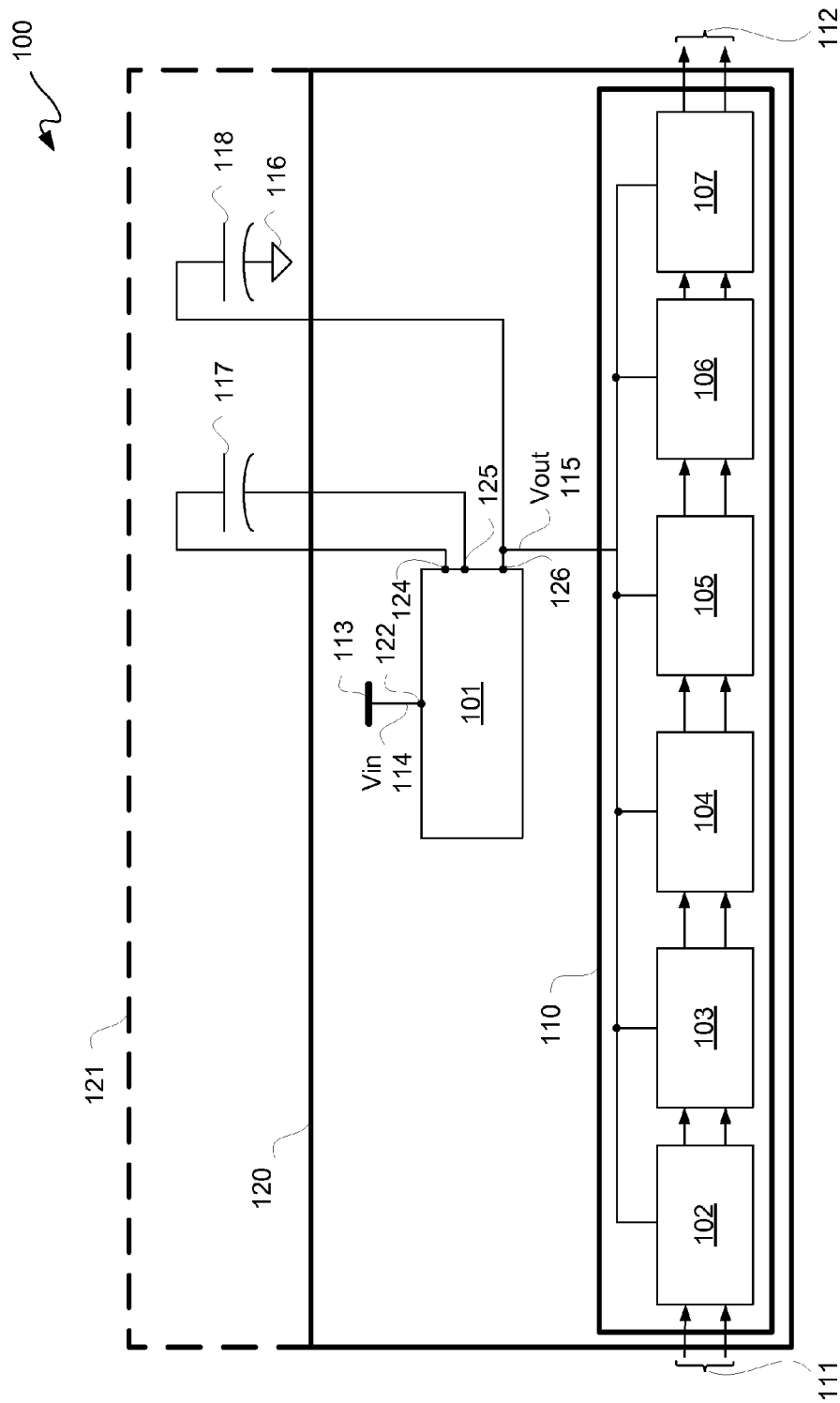
FIG. 2 is a block diagram depicting an exemplary embodiment of an intermediary signal conditioning system.

FIG. 2 is a block diagram depicting an exemplary embodiment of an intermediary signal conditioning system 100. Intermediary signal conditioning system 100 includes driver circuit 110 and DC-to-DC voltage converter 101, and may further include capacitors 117 and 118. Intermediary signal conditioning system may be located between a transmitter and a receiver, such as transmitter 11 and receiver 30 of FIG. 1 for example.

Driver circuit 110 receives input information from a transmitting device and provides output information to a receiving device or to another driver circuit 110. Intermediary signal conditioning system 100 may be formed on a single monolithic IC or an MCM 120. For reasons of die size for an IC embodiment, capacitors 117 and 118 may be external to an IC 120. For an MCM embodiment, capacitors 117 and 118 may be internal or external to such MCM, as generally indicated by dashed line 121. However, for purposes of clarity by way of example and not limitation, it shall be assumed that both capacitors 117 and 118 are external to an IC or MCM 120.

Furthermore, for purposes of clarity by way of example and not limitation, it shall be assumed that driver circuit 110 and DC-to-DC voltage converter 101 are formed of separate dies as part of an MCM 120. However, a single die may be used in which both DC-to-DC voltage converter 101 and driver circuit 110 are co-located.

Driver circuit 110 includes input termination 102, equalizer 103, limiter 104, programmable driver 105, output stage 106, and output termination 107. Additional details regarding an embodiment of driver circuit 110 may be found in U.S. Pat. No. 7,915,923, which is incorporated by reference herein in its entirety for all purposes.

Differential serial information, such as differential serial data 111, is input to input termination 102. Even though an example of driver circuit 110 is provided, and another embodiment of driver circuit 110 is described in U.S. Pat. No. 7,915,923, MCM 120 is not limited to the particular implementation of a differential driver circuit 110 illustratively depicted or incorporated by reference. Rather, any intermediary signal conditioning device using power voltage supply levels generally associated with MOS-based devices may be used.

After differential serial data 111 is processed through blocks 102 through 107, output from output termination 107 is provided as differential information, such as differential serial data 112. Each of blocks 102 through 107 has power supplied by an output voltage ("Vout") 115, where output voltage 115 is sourced from an output voltage node 126 of DC-to-DC voltage converter 101.

As previously described, DC-to-DC voltage converter 101 is "inductorless." In other words, no internal or external inductors need be used for operation of DC-to-DC voltage converter 101 as described herein.

DC-to-DC voltage converter 101 is coupled to a supply voltage source 113. From supply voltage source 113, which for example may be at a BJT Vdd level or other relatively high supply voltage level with respect to output voltage level of output voltage 115, an input voltage ("Vin") 114 is obtained at an input voltage node 122 of DC-to-DC voltage converter 101. A capacitor 117 is coupled between an interim common node 124 and an interim common node 125 of DC-to-DC voltage converter 101. A capacitor 118 is coupled between output voltage node 126 of DC-to-DC voltage converter 101 and ground 116.

DC-to-DC voltage converter 101 is configured to convert input voltage 114, which is a relatively high external supply voltage, to provide a stable and regulated internal supply, with respect to an IC or MCM embodiment, for high-speed circuitry associated with driver circuit 110. For purposes of clarity by way of example and not limitation, it shall be assumed that supply voltage source 113 is for a conventional BJT-based intermediary signal conditioning device. However, DC-to-DC voltage converter 101 is a MOS-based device. Furthermore, driver circuit 110 is also a MOS-base device, and thus output voltage 115 is substantially stepped down from input voltage 114 by DC-to-DC voltage converter 101. Thus, intermediary signal conditioning system 100 may be used in interim communication applications conventionally designed for BJT-based devices. Additionally, MOS devices, in contrast to BJT devices, conventionally consume less power. Additional details regarding DC-to-DC voltage converter 101 may be found in U.S. patent application Ser. No. 13/008,328, which is incorporated by reference herein in its entirety for all purposes.

Figure 3:
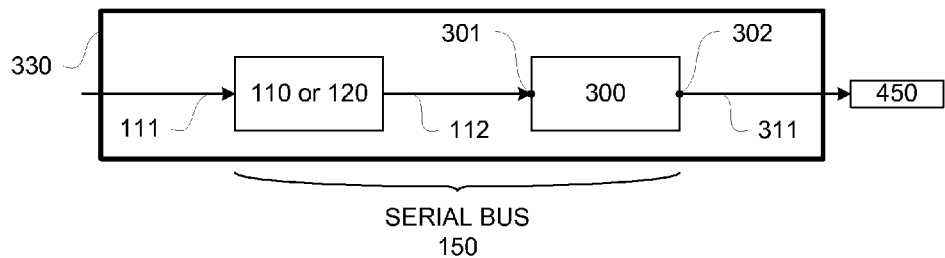
FIG. 3 is a block diagram depicting an exemplary embodiment of signal conditioner coupled to an output of a driver circuit or a multi-chip module.

FIG. 3 is a block diagram depicting an exemplary embodiment of signal conditioner 300 coupled to the output of a driver circuit 110 or an MCM 120. Signal conditioner 300 may be part of a serial bus 150. Output of driver circuit 110 or MCM 120 may be a transmitted signal, such as differential serial data 112 for example, which is provided to an input port 301 of signal conditioner 300. A conditioned version of such a transmitted signal ("conditioned signal") 311 is output from signal conditioner 300 via output port 302. Output port 302 may be coupled to a cable, trace lines ("traces"), or other form of transmission medium 450. In an embodiment, signal conditioner 300 and driver circuit 110 or MCM 120 may be formed as part of a same semiconductor die or a stacked die to be provided as a single integrated circuit chip.

Figure 4:
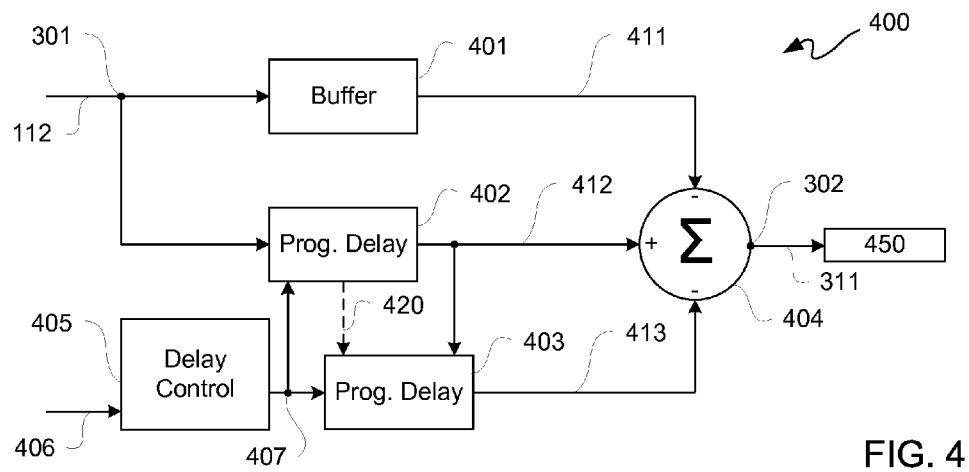
FIG. 4 is a block diagram depicting an exemplary embodiment of a wave shaping circuit.

FIG. 4 is a block diagram depicting an exemplary embodiment of a wave shaping circuit 400. Wave shaping circuit 400 may be used as signal conditioner 300 of FIG. 3. In other words, differential serial data 112 driven by driver circuit 110 or MCM 120 may be provided input port 301 of wave shaping circuit 400. Wave shaping circuit 400 may combine a precursor signal 411, a post cursor signal 413, and a main signal 412 to provide an output signal, namely conditioned signal 311. Wave shaping circuit 400 includes three delay blocks. In an embodiment, such three delay blocks may be differential logic blocks. In an embodiment, such differential logic blocks may be a buffer 401, a programmable delay 402, and a programmable delay 403. Wave shaping circuit 400 may be referred to as a programmable delay filter. Furthermore, in an embodiment, such three delay blocks may be current mode logic ("CML") blocks. Wave shaping circuit 400 further includes a combiner circuit 404, and a delay control 405.

A transmitted signal, such as differential serial data 112 for example, is provided to input port 301 for buffer 401 and programmable delay 402, as well as programmable delay 403 via programmable delay 402. Input port 301 is a common node coupled to buffer 401 and programmable delay 402 of wave shaping circuit 400. Output of buffer 401 may be a delayed version of a transmitted signal, such as differential serial data 112 for example, to provide a precursor signal 411, such as for emulation of a pre-shoot path for example. In this embodiment, precursor signal 411 is provided to a minus port of combiner circuit 404. Output of programmable delay 402 may be a delayed version of differential serial data 112, namely main signal 412 such as for emulation of a transition path for example. By transition path, it should be understood that for transmitted data a signal level may transition from a high voltage range to a low voltage range, and vice versa. In this embodiment, main signal 412 is provided to a plus port of combiner circuit 404. Such main signal 412 output from programmable delay 402 may likewise be provided as an input to programmable delay 403. Optionally, main signal 412 output from programmable delay 402 may be provided as an input to programmable delay 403 using a separate port than that used for providing main signal 412 to combiner circuit 404, as generally indicated by dashed line 420. Output of programmable delay 403 may be a delayed version of main signal 412, namely post cursor signal 413 such as for emulation of a pre-emphasis or de-emphasis path for example. Generally, programmable delays 402 and 403 may be coupled in series to provide a cumulative delay for post cursor signal 413. In this embodiment, post cursor signal 413 is provided to a minus port of combiner circuit 404. Combiner circuit 404 is configured to combine signals 411 through 413 to provide conditioned signal 311 as sourced from output port 302 of combiner circuit 404.

The respective three outputs from the three delay blocks, such as each of precursor signal 411, post cursor signal 413, and main signal 412, are provided for combination by combiner circuit 404 independently of a clock signal. In other words, wave shaping circuit 400 is not a clocked circuit or "non-clocked" circuit, as there is no clock signal provided to wave shaping circuit 400. While a transmitted signal processed by wave shaping circuit may have an embedded clock signal, wave shaping circuit 400 does not rely on such embedded clock signal for operation. Furthermore, wave shaping circuit 400 does not use any transitions in such transmitted signal for clocking. In an embodiment, combiner circuit 404 may be configured to combine current from each of precursor signal 411, post cursor signal 413, and main signal 412 to provide conditioned signal 311.

Main signal 412 may be delayed relative to precursor signal 411 by setting programmable delay 402 to delay differential serial data 112 signaling more than delay due to buffer 401 of such differential serial data 112 signaling. Furthermore, in some embodiments where differential serial data 112 has sufficient signal strength, buffer 401 may be omitted. Post cursor signal 413 may be delayed relative to main signal 412 by setting programmable delay 403 to delay main signal 412 more than delay due to programmable delay 402 of such main signal 412. However, each of programmable delay 402 and programmable delay 403 may be programmable from approximately 0 delay to a one unit interval of delay. Generally, one unit interval of delay is less than a bit period of a transmitted signal.

In this exemplary embodiment, main signal 412 may be delayed a maximum of one unit interval with respect to arrival of differential serial data 112 as input to programmable delay 402. Furthermore, in this exemplary embodiment, post cursor signal 413 may be delayed a maximum of one unit interval with respect to arrival of main signal 412 as input to programmable delay 403. Thus for example, generally main signal 412 may be delayed a maximum of approximately one unit interval with respect to precursor signal 411, and generally post cursor signal 413 may be delayed a maximum of approximately two unit intervals with respect to precursor signal 411.

Precursor signal 411 and post-cursor signal 413 may thus be used to condition a transmitted signal in the form of main signal 412 to provide a conditioned, including pre-conditioned, version of such transmitted signal in anticipation of signal loss and other events associated with downstream transmission via a transmission medium. In this embodiment, combiner circuit 404 is configured to subtract precursor signal 411 from main signal 412, and combiner circuit 404 is configured to subtract post cursor signal from main signal 412. Delay control 405 is coupled to respective control ports of programmable delay 402 and programmable delay 403. A delay set signal 407 is output from delay control 405 responsive to delay provided to delay control 405 via delay input signal 406. Delay set signal 407 is provided to programmable delay 402 and programmable delay 403 via such control ports thereof. In this embodiment, a delay setting for programmable delay 402 is equal to a delay setting for programmable delay 403.

Figure 5:
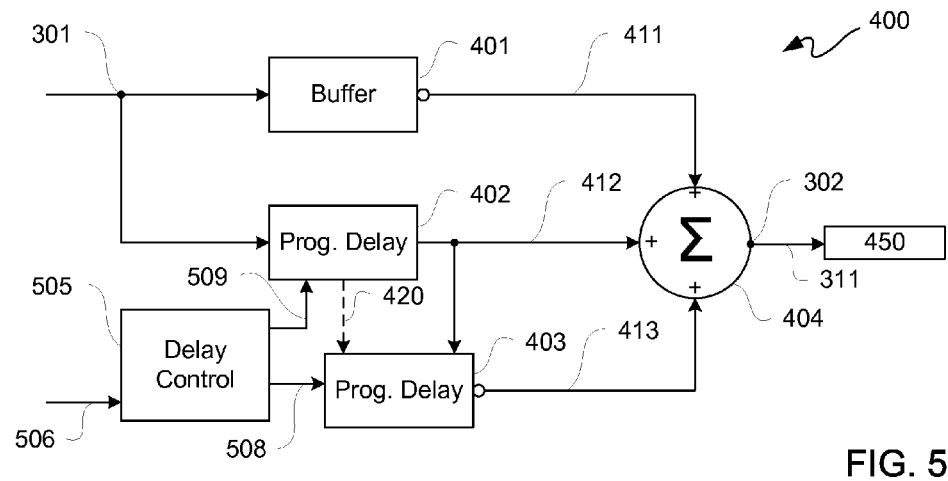
FIG. 5 is a block diagram depicting another exemplary embodiment of wave shaping circuit.

FIG. 5 is a block diagram depicting another exemplary embodiment of wave shaping circuit 400. For purposes of clarity, generally only differences between the exemplary embodiments of wave shaping circuit 400 as between FIGS. 4 and 5 are described below. In this exemplary embodiment of wave shaping circuit 400, precursor signal 411 is inverted as output from buffer 401 and provided to a plus port of combiner circuit 404. Likewise, in this exemplary embodiment of wave shaping circuit 400, post cursor signal 413 is inverted as output from programmable delay 403 and provided to a plus port of combiner circuit 404. In this exemplary embodiment, combiner circuit 404 may be a summer with three input paths and one output path, which is configured to add currents of the three input paths to provide a combined current of a signal via the output path. Of course other variations of the embodiments disclosed herein may be used.

Another difference between the exemplary embodiments of wave shaping circuit 400 in FIGS. 4 and 5 is replacement of delay control 405 with delay control 505. Delay control 505 receives delay input signal 506 for independently setting a first delay for programmable delay 402 and a second delay for programmable delay 403. Delay set signal 508 is provided from delay control 505 to program programmable delay 403, and delay set signal 509 is provided from delay control 505 to program programmable delay 402.

Figure 6:
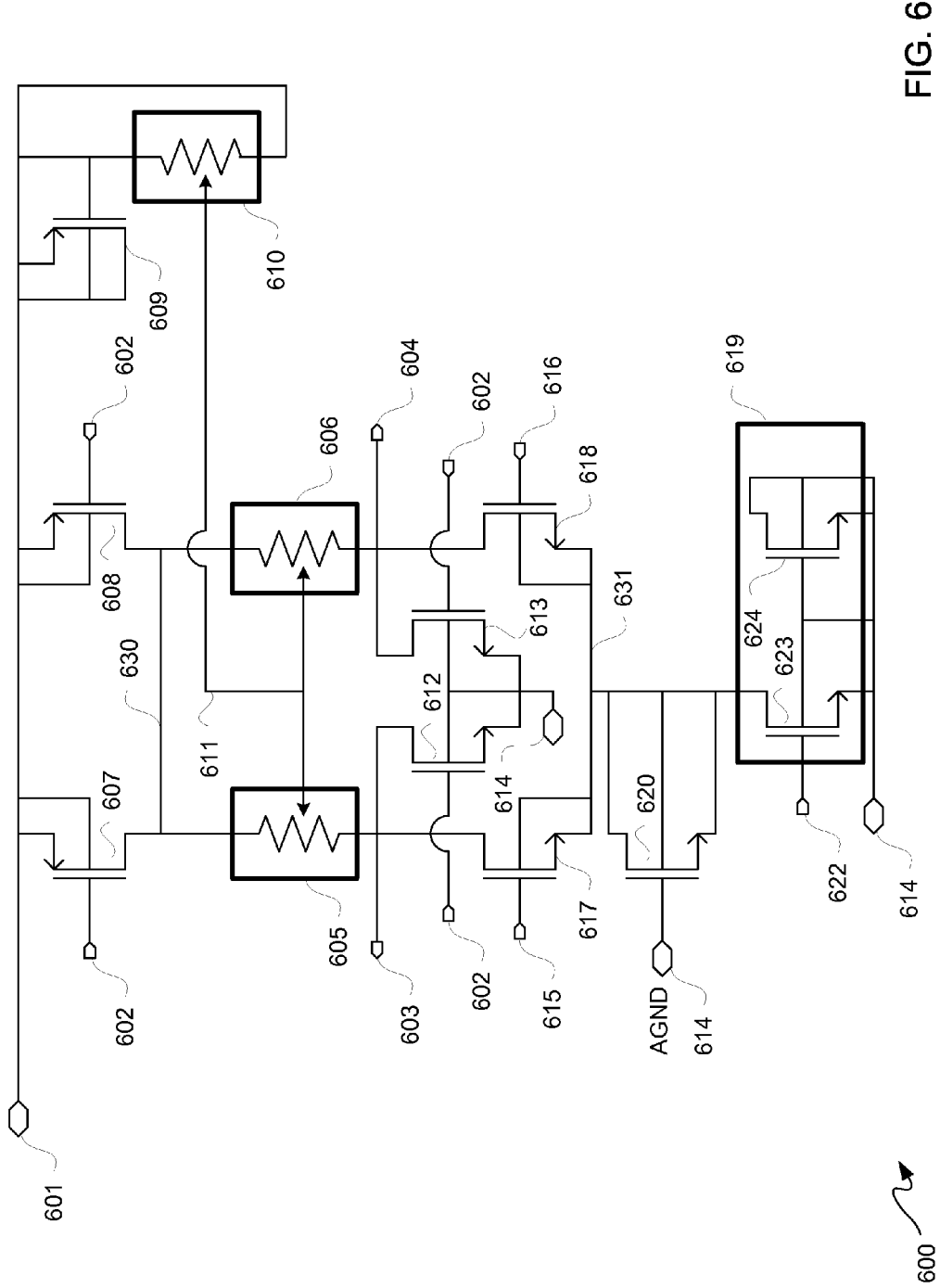
FIG. 6 is a circuit diagram depicting an exemplary embodiment of a programmable delay.

FIG. 6 is a circuit diagram depicting an exemplary embodiment of a programmable delay 600. Programmable delay 600 may be an embodiment of a programmable delay, as described elsewhere herein. Thus, two instances of programmable delay 600 may be used to provide programmable delays 402 and 403, where each of such programmable delays is set to a delay value associated with a resistive load, as described below in additional detail. Programmable delay 600 is a current-mode-logic ("CML") circuit. More particularly, programmable delay 600 is a differential CML circuit employing analog voltages as described below in additional detail.

An analog positive-side supply voltage ("AVDD") 601 is coupled to source nodes of PMOS transistor 607, 608, and 609. Furthermore, each of transistors 607, 608, and 609 is coupled to AVDD 601 for back body or back gate biasing. Gates of transistors 607 and 608 are coupled receive power down ("PD") signal 602. A gate of transistor 609 is coupled to receive AVDD 601.

Adjustable resistors 605, 606, and 610 have a common control node 611. Drain nodes of transistors 607 and 608 are commonly coupled to common node 630. Input nodes of adjustable resistors 605 and 606 are commonly coupled to common node 630. An input node of adjustable resistors 610 is coupled to AVDD 601. An output node of adjustable resistor 610 is likewise coupled to AVDD 601. Resistance of adjustable resistor 610 may be substantially larger than resistances of adjustable resistors 605 and 606. Adjustable resistors 605 and 606 may be matching devices. In short, adjustable resistor 610 may be used to provide a voltage divider of AVDD 601 to common control node 611. Resistances of adjustable resistors 605 and 606 may be relatively small. Adjustable resistor 605 and 606 may be used to provide a delay of programmable delay 600.

An output node of adjustable resistor 605 is coupled to an output node 603 of programmable delay 600. For clarity, output node 603 may be referred to as a negative side output ("output-N"). Output node of adjustable resistor 606 is coupled to output node 604 of programmable delay 600. For clarity, output node 604 may be referred to as a positive side output ("output-P").

NMOS transistors 612 and 613 have their source nodes coupled to an analog negative-side supply voltage ("analog ground") 614. Furthermore, NMOS transistor 612 and 613 are back body biased with analog ground 614. A drain node of transistor 612 is coupled to output-N node 603, and a drain node of transistor 613 is coupled to output-P node 604. Gates of transistor 612 and 613 are gated with power down signal 602.

When power down signal 602 is asserted, output nodes 603 and 604 are coupled to analog ground 614 via transistors 612 and 613, respectively, as those transistors are on when power down signal 602 is asserted. Furthermore, when power down signal 602 is asserted, transistor 607 and 608 are both off, and thus input nodes of adjustable resistors 605 and 606 are decoupled from AVDD 601.

When power down signal 602 is not asserted, transistors 612 and 613 are off, and transistor 607 and 608 are on. Accordingly, input nodes of adjustable resistors 605 and 606, or more particularly common node 630, is coupled to AVDD 601 via transistor 607 and 608.

NMOS transistor 617 has its drain node coupled to output-N node 603, and NMOS transistor 618 has its drain node coupled to output-P node 604. A gate of transistor 617 is coupled to receive a positive side input ("input-P") 615, and a gate of transistor 618 is coupled to receive a negative side input ("input-N") 616. Thus, input-P signal 615 and output-N node 603 are on one side of programmable delay 600, and input-N signal 616 and output-P node 604 are on another side ("opposite side") of programmable delay 600.

Source nodes of transistors 617 and 618 are coupled to common node 631. Additionally, back body regions of transistor 617 and 618 are coupled to common node 631. A drain node, a source node, and a back body region of NMOS transistor 620 are all coupled to common node 631, and a gate of transistor 620 is coupled to analog ground 614.

Current source 619 is coupled between common node 631 and analog ground 614. Current source 619 includes NMOS transistor 623 and 624. Transistor 624 has its source node, drain node, and back body region coupled to analog ground 614. A back body region of transistor 623 and a gate of transistor 624 are likewise commonly coupled to analog ground 614. A source node of transistor 623 is coupled to analog ground 614, and a drain node of transistor 623 is coupled to common node 631. A gate of transistor 623 is coupled to receive a reference voltage, namely bias voltage signal 622.

Generally, by setting a resistance for each of adjustable resistors 605 and 606, differential input provided by input signals 615 and 616 is a delayed responsive to such resistance setting for providing a differential output via an output nodes 603 and 604. Current output via output nodes 603 and 604 is delayed responsive to such resistance setting. Outputs of output nodes 603 and 604 may swing from at least approximately AVDD 601 to analog ground 614 levels, where such outputs of the output nodes 603 and 604 swing or transition in opposite directions of one another.

Figure 7:
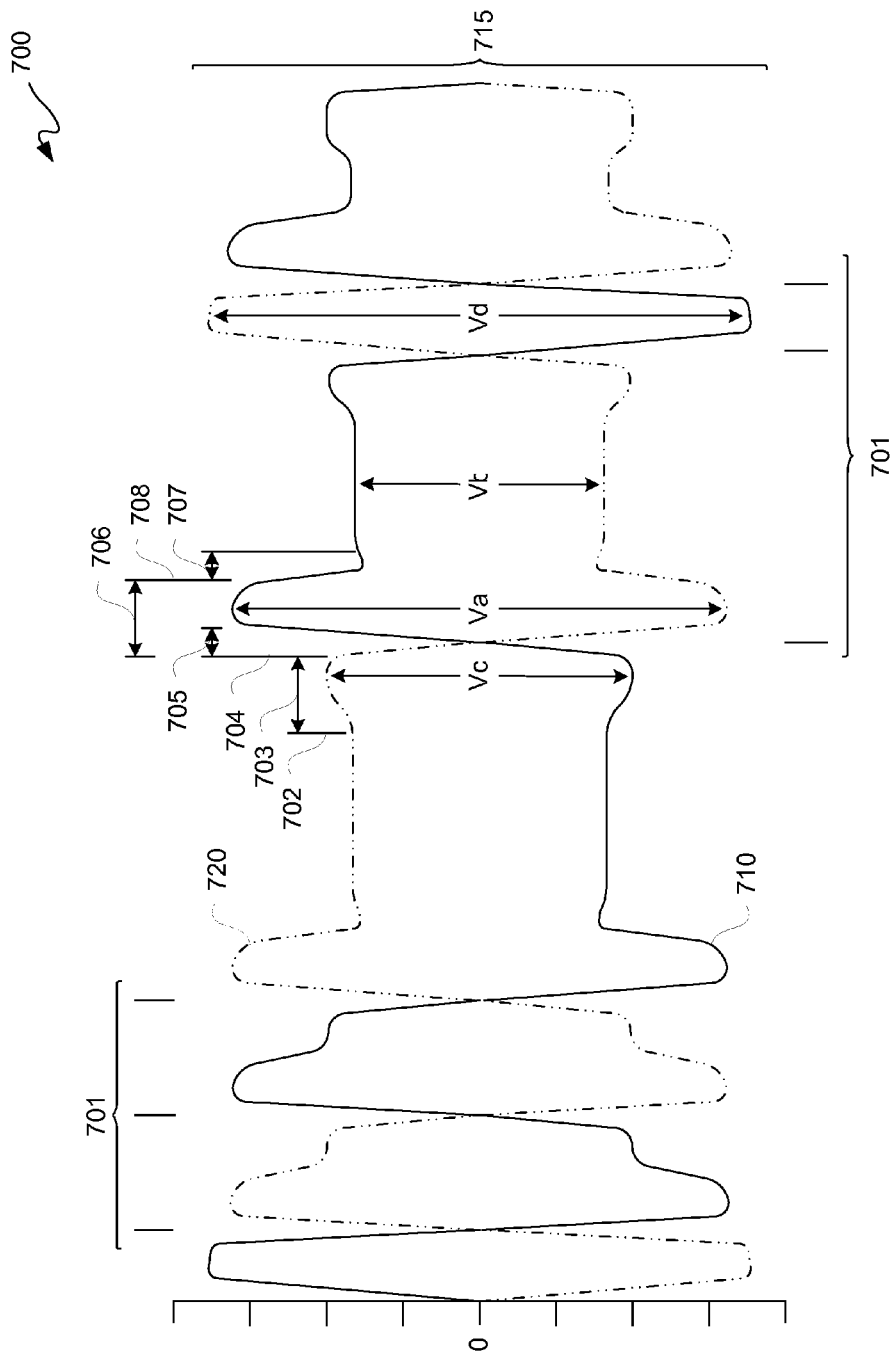
FIG. 7 is a signal diagram depicting an exemplary embodiment of an output waveform, where a solid line indicates a "true" portion of a differential signal and a dash line indicates a "complement" portion of such a differential signal.

FIG. 7 is a signal diagram depicting an exemplary embodiment of an output waveform 700, where a solid line indicates a "true" portion 710 of a differential signal 715 and a dash line indicates a "complement" portion 720 of differential signal 715. Waveform 700 may be a conditioned signal 311 output from output port 302, as described elsewhere herein. Both data ones and zeros are illustratively depicted, with transitions 701 indicating where waveform 700 transitions from a data one to a data zero and vice versa. For purposes of clarity, waveform 700 is illustratively depicted as a non-return to zero ("NRZ") encoded waveform; however, other types of encoded waveforms may be used, including a non-return to zero inverted/IBM ("NRZI") or other differential waveform.

Figure 8:
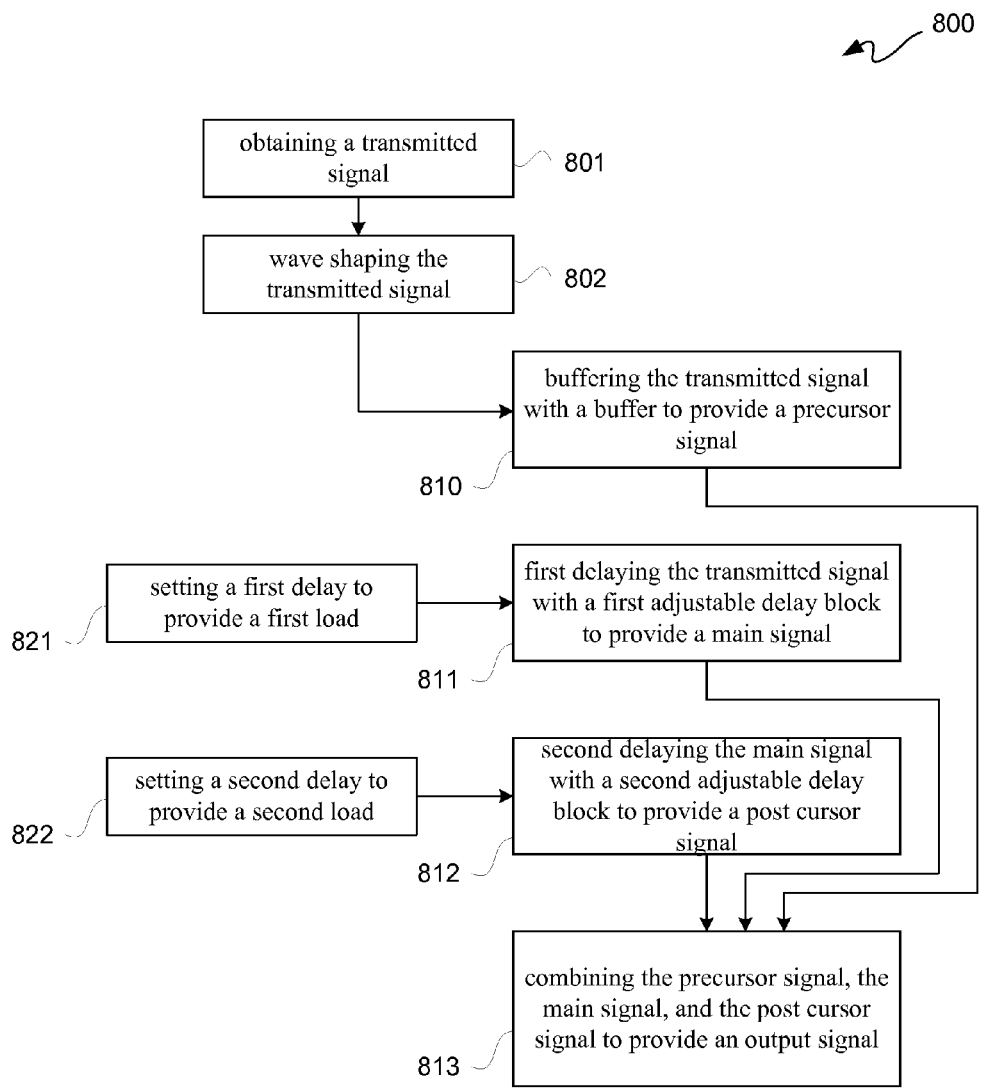
FIG. 8 is a flow diagram depicting an exemplary embodiment of a programmable delay filtering process.

FIG. 8 is a flow diagram depicting an exemplary embodiment of a programmable delay filtering process 800. Programmable delay filtering process 800 is described with simultaneous reference to FIGS. 7 and 8. At 801, a transmitted signal is obtained. At 802, the transmitted signal obtained at 801 is wave shaped. Wave shaping at 802 may include operations 810 through 813.

At 810, such transmitted signal may be buffered with a buffer to provide a precursor signal. An application of such precursor signal is indicated as pre-emphasis interval 703, which interval or region in this embodiment begins generally at 702 and ends generally at 704. A pre-emphasis signal may be of a fixed delay due to use of a buffer, which in this exemplary embodiment is one unit interval of delay. However, other amounts of delay less than one unit interval may be used. Application of such precursor signal may cause an eye-opening to increase from a voltage difference of approximately Vb to a voltage difference of approximately Vc in preparation for attenuation due to subsequent propagation along a transmission medium.

At 811, such transmitted signal may be delayed with a first adjustable delay block to provide a main signal. After such pre-shoot from pre-emphasis interval 703, at 811 such transmitted signal obtained at 801 may be delayed longer than delay caused by buffering at 810. At 704, a transition interval 706 is initiated as associated with a transition 701. Such transition 701, which may have duration 705, may be completed within transition interval 706. In this embodiment, such a main signal associated with transition interval 706 has a one unit interval of delay with respect to such a precursor signal. However, other amounts of delay less than one unit interval may be used. Such amount of delay may be set at 821 as a first delay to provide a first load, such as a first resistive load. During transition interval 706, combined signals may overall be additive causing an eye-opening to increase to a voltage difference Va, which is significantly larger than voltage differences Vb and Vc. Voltage difference Va may be sufficiently greater than voltage difference Vb in preparation for attenuation due to subsequent propagation along a transmission medium. Attenuation generally is greatest along a transmission medium immediately after a transition 701.

At 812, such main signal is delayed with a second adjustable delay to provide a post cursor signal. After transition interval 706, at 812 such main signal provided at 811 may be delayed up to one unit interval longer than delay imposed at 811. At 708, a de-emphasis interval 707 is initiated. In this embodiment, such a post cursor signal associated with de-emphasis interval 707 has less than a one unit interval of delay with respect to such a main signal. However, other amounts of delay less than or up to a one unit interval of delay may be used. Such amount of delay may be set at 822 as a second delay to provide a second load, such as a second resistive load. During de-emphasis interval 707, combined signals may overall be subtractive causing an eye-opening to decrease to a voltage difference that generally settles at voltage difference Vb.

At 813, such precursor, main, and post cursor signals respectively provided at 810, 811, and 812 are combined subject to their respective delays to provide an output signal. Such precursor signal, main, and post cursor signal are combined independently of a clock signal. In other words, no clock signal is used to control combination of such precursor, main, and post cursor signals. Rather, as previously described, such precursor signal is delay due to buffering, such main signal is delayed due to a first load, and such post cursor signal is delay due to a second load.

It is not necessary that all voltage differences be the same. For example, voltage difference Vd following a data 1 to data 0 transition may be larger than voltage difference Va following a data 0 to data 1 transition.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. An apparatus for signal conditioning, comprising:
a wave shaping circuit having a precursor signal, a post cursor signal, and a main signal combined to provide an output signal;
wherein the precursor signal, the post cursor signal, and the main signal are provided for combination independently of a clock signal;
wherein the main signal is delayed relative to the precursor signal;
wherein the post cursor signal is delayed relative to the main signal;
wherein:
the wave shaping circuit includes a first programmable delay and a second programmable delay; and
each of the first programmable delay and the second programmable delay is programmable from approximately 0 delay to a one unit interval of delay.

2. The apparatus according to claim 1, wherein:
the wave shaping circuit further includes a buffer and a combiner circuit;
the buffer and the first programmable delay are coupled to receive an input signal;
the second programmable delay is coupled to receive the input signal via the first programmable delay;
the combiner circuit is coupled to receive the input signal as:
the precursor signal via the buffer,
the main signal via the first programmable delay; and
the post cursor signal via a series of the first programmable delay and the second programmable delay.

3. The apparatus according to claim 2, wherein the buffer and the first programmable delay are coupled to a common node to receive the input signal.

4. The apparatus according to claim 2, wherein:
the combiner circuit is configured to subtract the precursor signal from the main signal; and
the combiner circuit is configured to subtract the post cursor signal from the main signal.

5. The apparatus according to claim 4, wherein:
the wave shaping circuit yet further includes a delay control coupled to the first programmable delay and the second programmable delay; and
the delay control configured to independently set a first delay for the first programmable delay and a second delay for the second programmable delay.

6. The apparatus according to claim 4, wherein:
the wave shaping circuit yet further includes a delay control coupled to the first programmable delay and the second programmable delay; and
the delay control configured to set a first delay for the first programmable delay and a second delay for the second programmable delay equal to one another.

7. A system including the apparatus of claim 4, the system comprising a driver circuit coupled to provide the input signal to the buffer and the first programmable delay of the apparatus.

8. The system according to claim 7, wherein the driver circuit and the apparatus are formed on a single integrated circuit chip.

9. A serial data interface, comprising:
an input port and an output port;
the input port for receiving a transmitted signal;
the input port coupled to a first delay block and a second delay block for providing the transmitted signal to each thereof;
a third delay block coupled to the second delay block for receiving the transmitted signal;
a first output of the first delay block being a precursor signal for emulation of a pre-shoot path;
a second output of the second delay block being a main signal for emulation of a transition path;
a third output of the third delay block being a post cursor signal for emulation of pre-emphasis or de-emphasis path;
wherein the precursor signal and the post cursor signal are for conditioning the main signal to provide a conditioned version of the transmitted signal independently of a clock; and
a combiner circuit to receive and to combine the first output, the second output, and the third output to provide the conditioned version of the transmitted signal to the output port.

10. The serial data interface according to claim 9, wherein:
the conditioned version of the transmitted signal is for providing to a transmission medium coupled to the output port; and
the transmission medium is selected from a group consisting of a cable and a trace line.

11. The serial data interface according to claim 9, wherein:
the second delay block is a first programmable delay; and
the third delay block is a second programmable delay.

12. The serial data interface according to claim 11, wherein each of the first programmable delay and the second programmable delay is programmable from approximately 0 delay to a maximum of a one unit interval of delay.

13. The serial data interface according to claim 12, wherein the one unit interval of delay is less than a bit period of the transmitted signal.

14. The serial data interface according to claim 11, wherein:
the first delay block is a buffer;
the first delay block, the second delay block, and the third delay block are differential logic blocks.

15. The serial data interface according to claim 14, wherein the first delay block, the second delay block, and the third delay block are current mode logic ("CML") blocks.

16. The serial data interface according to claim 14, wherein the combiner circuit combines current from each of the first output, the second output, and the third output to provide the conditioned version of the transmitted signal to the output port.

17. The serial data interface according to claim 16, wherein:
the first delay block is configured to invert the transmitted signal to provide the first output;
the third delay block is configured to invert the transmitted signal to provide the third output; and
the combiner circuit is a summer having respective plus ports for adding the current from each of the first output, the second output, and the third output.

18. A method for a programmable delay filter, comprising:
obtaining a transmitted signal;
wave shaping the transmitted signal by:
- buffering the transmitted signal with a buffer to provide a precursor signal;
- first delaying the transmitted signal with a first adjustable delay to provide a main signal;
- wherein the main signal is delayed relative to the precursor signal;
- second delaying the main signal with a second adjustable delay to provide a post cursor signal;
- combining the precursor signal, the main signal, and the post cursor signal to provide an output signal;
- wherein the precursor signal, the main signal, and the post cursor signal are combined independently of a clock signal;

setting a first delay to provide a first load;
setting a second delay to provide a second load;
wherein the first delaying is responsive to the first load to delay the transmitted signal to provide the main signal; and
wherein the second delaying is responsive to the second load to delay the main signal to provide the post cursor signal.

* * * * *